(12) United States Patent
Berhan

(10) Patent No.: US 12,107,475 B2
(45) Date of Patent: Oct. 1, 2024

(54) VEHICLE AND ELECTRIC MACHINE CONFIGURATION FOR A VEHICLE

(71) Applicant: FORD GLOBAL TECHNOLOGIES, LLC, Dearborn, MI (US)

(72) Inventor: Michael Tekletsion Berhan, Sylvania, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 17/738,507

(22) Filed: May 6, 2022

(65) Prior Publication Data
US 2023/0361643 A1 Nov. 9, 2023

(51) Int. Cl.
H02K 5/10 (2006.01)
F16J 15/447 (2006.01)
H02K 7/00 (2006.01)

(52) U.S. Cl.
CPC ............ *H02K 5/10* (2013.01); *F16J 15/447* (2013.01); *H02K 7/003* (2013.01)

(58) Field of Classification Search
CPC .......... F16J 15/447; H02K 7/003; H02K 5/10
See application file for complete search history.

(56) References Cited

U.S. PATENT DOCUMENTS

| | | | | |
|---|---|---|---|---|
| 2,779,640 A * | 1/1957 | Jones, Jr. | ............ | F16C 33/7869 384/480 |
| 4,093,324 A * | 6/1978 | Carrigan | ................. | F16C 33/80 277/420 |
| 4,348,067 A * | 9/1982 | Tooley | ..................... | F16C 33/80 384/480 |
| 4,379,600 A * | 4/1983 | Muller | ..................... | F16C 33/80 384/480 |
| 4,679,801 A | 7/1987 | Poloni | | |
| 5,129,744 A * | 7/1992 | Otto | ....................... | B21B 31/078 277/351 |
| 5,290,047 A * | 3/1994 | Duffee | ................. | F16J 15/4474 277/419 |

(Continued)

FOREIGN PATENT DOCUMENTS

| | | |
|---|---|---|
| AU | 5627580 A | 9/1980 |
| CN | 109114201 A | 1/2019 |

(Continued)

*Primary Examiner* — Eugene G Byrd
(74) *Attorney, Agent, or Firm* — Vincent Mastrogiacomo; Brooks Kushman P.C.

(57) ABSTRACT

A vehicle includes an electric machine. The electric machine is configured to propel the vehicle. The electric machine has a stator, a rotor, and a labyrinth seal. The stator is secured to a housing. The rotor is secured to a shaft and is configured to transfer rotational power generated by the electric machine to at least one drive wheel via the shaft. The labyrinth seal is disposed between the shaft and the housing. The labyrinth seal comprises inner and outer rings secured to the shaft and housing, respectively. The inner and outer rings have interleaved protrusions defining a tortuous channel extending axially between first and second ends of the labyrinth seal. A conductive grease is disposed within the tortuous channel. The inner ring, outer ring, and conductive grease are configured to direct electrical currents induced in the shaft to the housing.

20 Claims, 3 Drawing Sheets

(56) References Cited

U.S. PATENT DOCUMENTS

| | | | | |
|---|---|---|---|---|
| 5,378,000 | A | * | 1/1995 | Orlowski ............. F16J 15/4478 277/910 |
| 5,383,549 | A | * | 1/1995 | Mayer ................... F16C 35/063 384/480 |
| 5,641,841 | A | | 6/1997 | Diaz et al. |
| 5,676,472 | A | * | 10/1997 | Solomon ................ B25J 21/005 384/480 |
| 6,155,574 | A | * | 12/2000 | Borgstrom ................ B04B 9/12 277/928 |
| 6,206,182 | B1 | * | 3/2001 | Wilson .................... B65G 39/09 198/842 |
| 6,385,849 | B1 | * | 5/2002 | Bryant, Jr. ............ F16C 13/022 29/430 |
| 6,471,215 | B1 | | 10/2002 | Drago et al. |
| 6,834,859 | B2 | | 12/2004 | Tones |
| 6,843,482 | B1 | * | 1/2005 | Bayne ................. F16J 15/002 277/412 |
| 8,342,535 | B2 | * | 1/2013 | Lattime ................ F16J 15/3256 277/411 |
| 8,991,829 | B2 | * | 3/2015 | Lattime ................... F16C 33/80 277/411 |
| 9,273,731 | B2 | * | 3/2016 | Kirkpatrick ........... F16C 13/022 |
| 9,714,661 | B2 | | 7/2017 | Ashida et al. |
| 10,584,795 | B2 | | 3/2020 | Peterson |
| 2007/0138748 | A1 | | 6/2007 | Orlowski et al. |
| 2019/0162312 | A1 | * | 5/2019 | Okaji ...................... F16C 19/06 |
| 2021/0048071 | A1 | | 2/2021 | Hargraves |

FOREIGN PATENT DOCUMENTS

| | | |
|---|---|---|
| CN | 209709888 U | 11/2019 |
| DE | 102009010717 B4 | 9/2021 |
| EP | 0015739 A1 | 9/1980 |
| EP | 0196117 B1 | 11/1989 |
| EP | 3611828 A1 | 2/2020 |
| GB | 697784 A | 9/1953 |
| GB | 1031397 A | 6/1966 |
| JP | 2003176832 A | 6/2003 |
| JP | 6050570 B2 * | 12/2016 |
| JP | 2019086152 A | 6/2019 |
| WO | 2021136834 A1 | 7/2021 |

* cited by examiner

VEHICLE AND ELECTRIC MACHINE CONFIGURATION FOR A VEHICLE

TECHNICAL FIELD

The present disclosure relates to hybrid and electric vehicles, and electric machines that may be utilized in hybrid and electric vehicles.

BACKGROUND

Hybrid and electric vehicles may include an electric machine that is configured to propel the vehicle or recover kinetic energy via regenerative breaking.

SUMMARY

A vehicle includes an electric machine. The electric machine is configured to propel the vehicle. The electric machine has a stator, a rotor, and a labyrinth seal. The stator is secured to a housing. The rotor is secured to a shaft and is configured to transfer rotational power generated by the electric machine to at least one drive wheel via the shaft. The labyrinth seal is disposed between the shaft and the housing. The labyrinth seal comprises inner and outer rings secured to the shaft and housing, respectively. The inner and outer rings have interleaved protrusions defining a tortuous channel extending axially between first and second ends of the labyrinth seal. A conductive grease is disposed within the tortuous channel. The inner ring, outer ring, and conductive grease are configured to direct electrical currents induced in the shaft to the housing.

A vehicle includes a housing, an electric machine, and a labyrinth seal. The electric machine is disposed within the housing. The electric machine has a rotor shaft configured to transfer rotational power generated by the electric machine. The labyrinth seal is disposed between the rotor shaft and the housing. The labyrinth seal comprises a radially inner portion secured to the rotor shaft and a radially outer portion secured the housing. The inner and outer portions have interleaved elastic protrusions defining a tortuous channel extending axially between first and second ends of the labyrinth seal. The inner and outer portions have first and second conductive regions. A conductive grease is disposed within the tortuous channel. The first conductive region, the second conductive region, and the conductive grease form an electrically conductive pathway between the rotor shaft and the housing.

An electric machine includes a housing, a stator, a rotor shaft, a labyrinth seal, and a conductive grease. The housing defines an internal chamber. The stator is disposed within and is secured to a housing. The rotor shaft is configured to transfer rotational power generated by the electric machine. The labyrinth seal is disposed between the rotor shaft and the housing. The labyrinth seal comprises first and second rings secured to the rotor shaft and housing, respectively. The first and second rings have interleaved projections defining a tortuous channel extending between first and second axial ends of the labyrinth seal. The conductive grease is disposed within the tortuous channel. The first ring, the second ring, and the conductive grease form an electrically conductive pathway between the rotor shaft and the housing.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
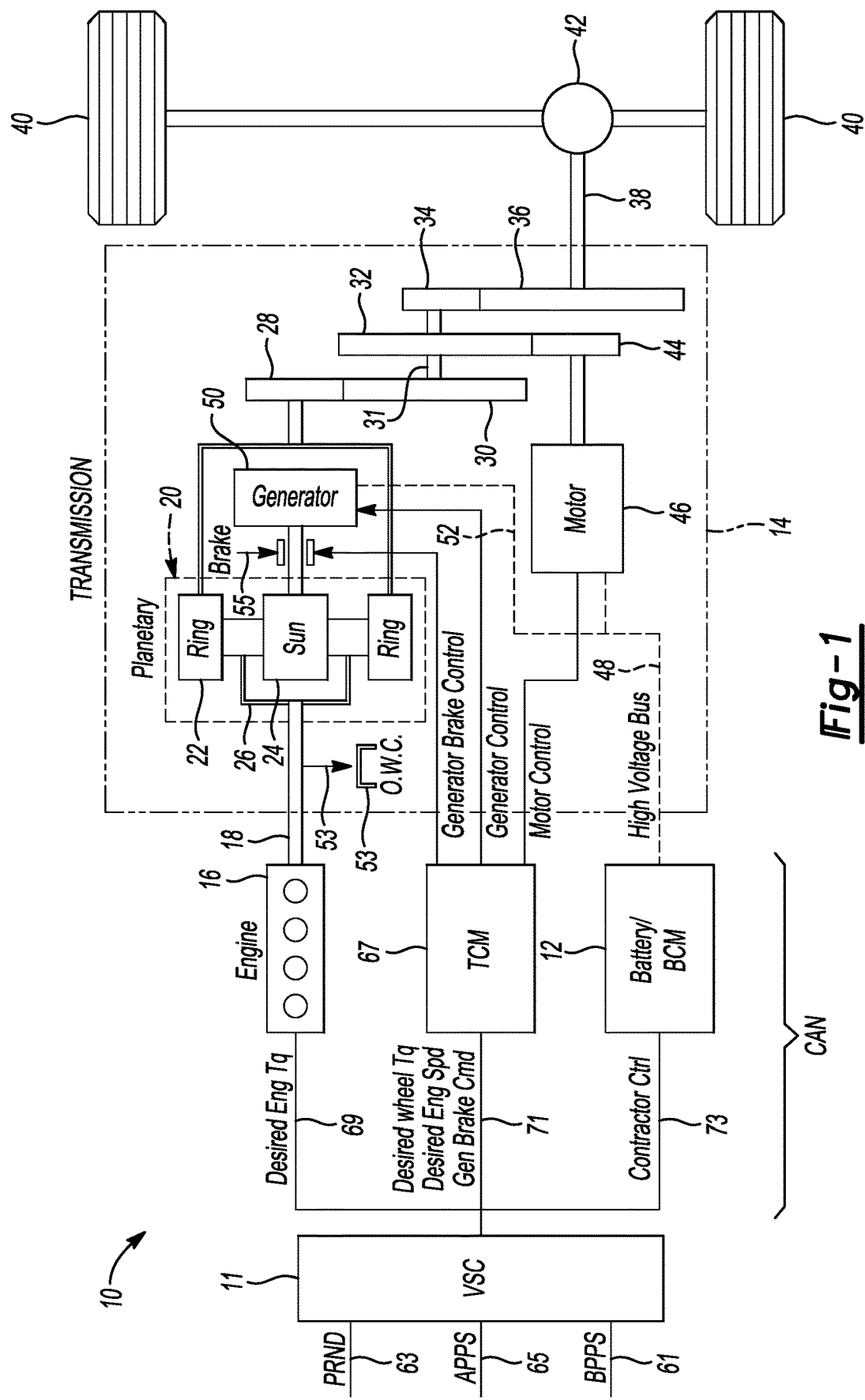
FIG. 1 is a schematic illustration of a representative powertrain of a hybrid electric vehicle.

Referring now to FIG. 1, a hybrid electric vehicle 10 having a powersplit powertrain is illustrated. The powertrain includes two power sources that are connected to the driveline: (1) an engine 16 and an electric machine 50 (which may be referred to as a generator) connected together via a planetary gear arrangement 20; and (2) an electric drive system including a battery 12 having a battery control module (BCM), an electric machine 46 (which may be referred to as a motor) and a generator 50. Battery 12 is an energy storage system for motor 46 and generator 50.

A vehicle system controller (VSC) 11 is configured to send control signals to and receive sensory feedback information from one or more of battery 12, engine 16, motor 46, and generator 50 in order for power to be provided to vehicle traction wheels 40 for propelling the vehicle 10. Controller 11 controls the power source proportioning between battery 12 and engine 16 for providing power to propel the vehicle 10 and thereby controls the state of charge (SOC) of battery 12.

Transmission 14 includes planetary arrangement 20, which includes a ring gear 22, a sun gear 24, and a carrier assembly 26. Ring gear 22 distributes torque to step ratio gears comprising meshing gear elements 28, 30, 32, 34, and 36. A torque output shaft 38 of transmission 14 is driveably connected to wheels 40 through a differential-and-axle mechanism 42. Gears 30, 32, and 34 are mounted on a counter shaft 31 with gear 32 engaging a motor-driven gear 44. Motor 46 drives gear 44. Gear 44 acts as a torque input for counter shaft 31. Engine 16 distributes torque through input shaft 18 to transmission 14. Battery 12 delivers electric power to motor 46 through power flow path 48. Generator 50 is connected electrically to battery 12 and to motor 46 through power flow path 52. The power flow paths 48 and 52 may include inverting circuitry to convert direct current power from the battery 12 into alternating current power, which may then be delivered to the motor 46 or generator 50 to increase the power output of the powertrain. The power flow paths 48 and 52 may also include rectifying circuitry to convert alternating current power from either the motor 46 or the generator 50 into direct current power, which may then be delivered to the battery 12 to recharge the battery 12, which may occur during regenerative braking or while the engine 16 is powering the generator 50.

While battery 12 is acting as a sole power source with engine 16 off, input shaft 18 and carrier assembly 26 are braked by an overrunning coupling (i.e., one-way clutch (OWC)) 53. A mechanical brake 55 anchors the rotor of generator 50 and sun gear 24 when engine 16 is on and the powertrain is in a parallel drive mode, sun gear 24 acting as a reaction element.

Controller 11 receives a signal PRND (park, reverse, neutral, drive) from a transmission range selector 63, which is distributed to transmission control module (TCM) 67, together with a desired wheel torque, a desired engine speed, and a generator brake command, as shown at 71. A battery switch 73 is closed after vehicle "key-on" startup. Controller 11 issues a desired engine torque request to engine 16, as shown at 69, which is dependent on accelerator pedal position sensor (APPS) output 65. A brake pedal position sensor (BPPS) distributes a wheel brake signal to controller 11, as shown at 61. A brake system control module (not shown) may issue to controller 11 a regenerative braking command based on information from the BPPS. TCM 67 issues a generator brake control signal to generator brake 55. TCM 67 also distributes a generator control signal to generator 50.

The controllers illustrated in FIG. 1 (i.e., VSC 11, BCM, and TCM 67) may be part of a larger control system and may be controlled by various other controllers throughout the vehicle 10. It should therefore be understood that the controllers and one or more other controllers can collectively be referred to as a "controller" that controls various actuators in response to signals from various sensors to control functions such as starting/stopping engine 16, operating the motor 46 to provide wheel torque, operating the generator to charge the battery 12, etc. The controllers may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controllers in controlling the vehicle 10.

It should be understood that the vehicle configuration described herein is merely exemplary and is not intended to be limited. Other hybrid or electric vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Referring to 2, an electric machine 100 is illustrated. The electric machine 100 may be representative of an electric machine that is utilized in a vehicle (e.g., motor 46, generator 50, or a motor-generation combination). The electric machine 100 may include a housing 102 that defines an internal chamber or cavity 104. The electric machine 100 includes a stator 106 and the rotor 108 that each may be disposed within the internal cavity 104 such that the housing 102 encloses the stator 106 and rotor 108. The stator 106 may be secured to or fixed to the housing 102 within the internal cavity 104. The stator 106 may be secured to or fixed to the housing 102 via fasteners or via some other method. For example, the stator 106 may be press-fit into the internal cavity 104. The rotor 108 is secured to a shaft 110. The rotor 108 may be secured to or fixed to the shaft 110 via fasteners or via some other method. For example, the rotor 108 may be press-fit onto the shaft. The shaft 110 may be referred to as the rotor shaft. The shaft 110 may include an input end 112 and an output end 114 that each protrude from the housing 102. In some configurations, the shaft 110 may only protrude from the housing 102 at the input end 112 (e.g., if the electric machine 100 is only operated as a generator) or may only protrude from the housing 102 at the output end 114 (e.g., if the electric machine 100 is only operated as a motor).

The input end 112 of the shaft 100 may be secured to other portions of a powertrain and may be configured to receive rotational power from such other portions of the powertrain. For example, the input end 112 may be directly or indirectly (e.g., via gears, belts, shafts, etc.) connected to an internal combustion engine (e.g., engine 16). The output end 114 of the shaft 100 may also be secured to other portions of a powertrain and may be configured to transfer or deliver rotational power generated by the electric machine 100 to such other portions of the powertrain. For example, the output end 114 may be directly or indirectly (e.g., via gears, belts, shafts, etc.) connected to drive wheels of a vehicle (e.g., wheels 40) to transfer or deliver the rotational power generated by the electric machine 100 to the drive wheels of the vehicle.

The shaft 110 may be rotatably supported within the housing 102 via bearings 116. Seals 118 may be disposed about the shaft 110 at the input end 112 and the output end 114 in order retain cooling or lubricating fluid with internal cavity 104 of the housing 102 and to prevent the ingress of contaminants (e.g., dirt, pebbles, etc.) into the internal cavity 104. More specifically, the seals 118 are disposed between the shaft 110 and the housing 102. In embodiments where only one of the input end 112 or the output end 114 protrudes from the housing, only one seal 118 may be required. The bearings 116 and seals 118 may be secured to the housing 102 via a press-fit engagement with the housing 102.

Electrical currents induced in rotors, transfer shafts, and other shafts can cause both mechanical ("arcing") as well as wider electromagnetic interference ("AM noise," "broadband noise," etc.), which could result in damage to various components. Therefore, it is desirable to direct such electrical currents away from components that may be susceptible to damage from such electrical currents. For example, electrical currents may cause ball and cage churning within a bearing, which in turn degrades the grease within the bearing and increases drag. Therefore, it is particularly desirable to direct such electrical currents away from bearings.

Figure 2:
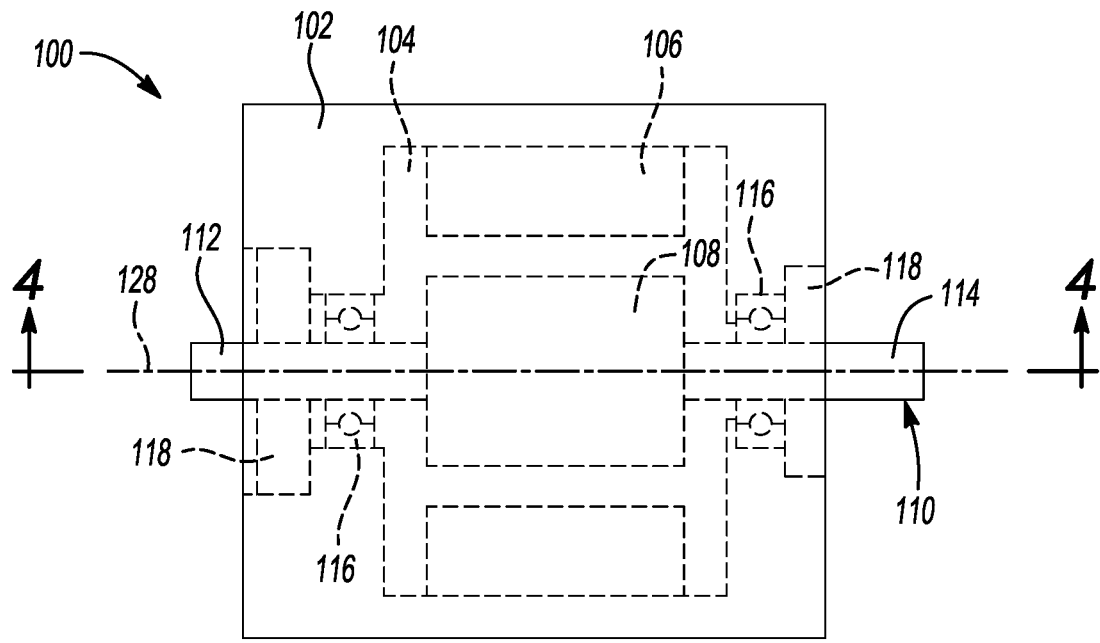
FIG. 2 is a schematic diagram of an electric machine.
Figure 3:
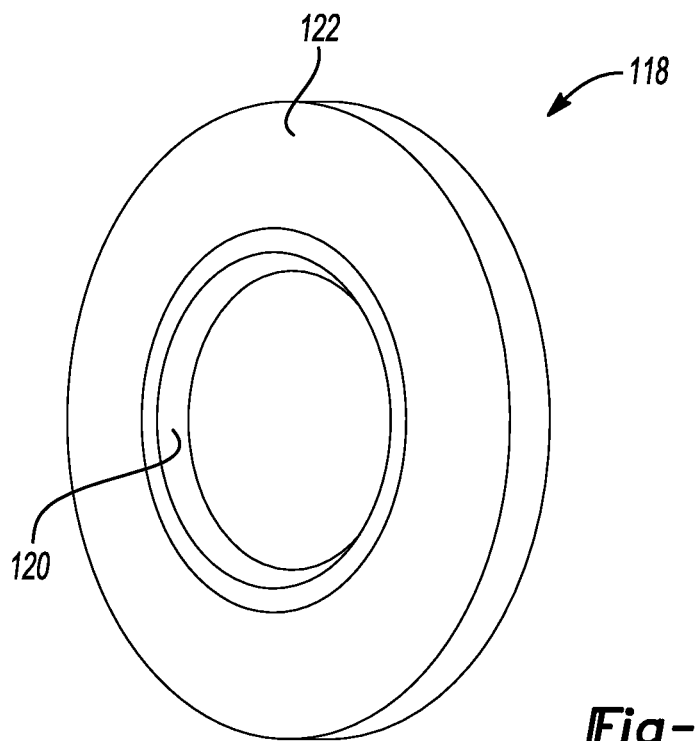
FIG. 3 is an isometric view of a seal that utilized within a housing of the electric machine.
Figure 5:
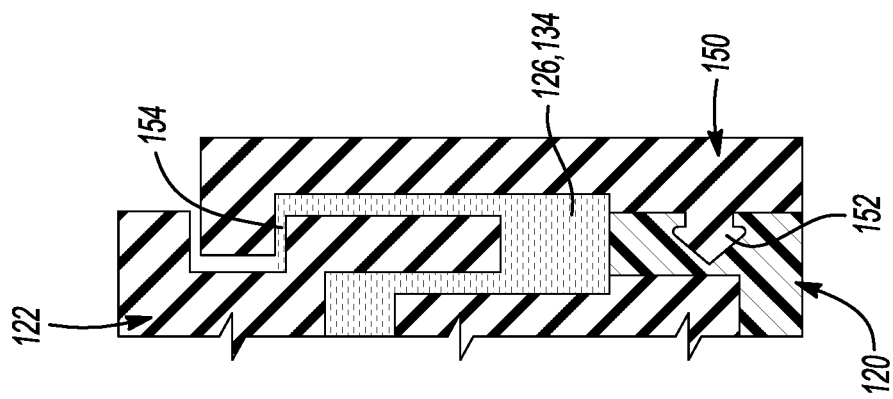
FIG. 5 is a partial cross-sectional view illustrating an alternative configuration of the seal.
Figure 4:
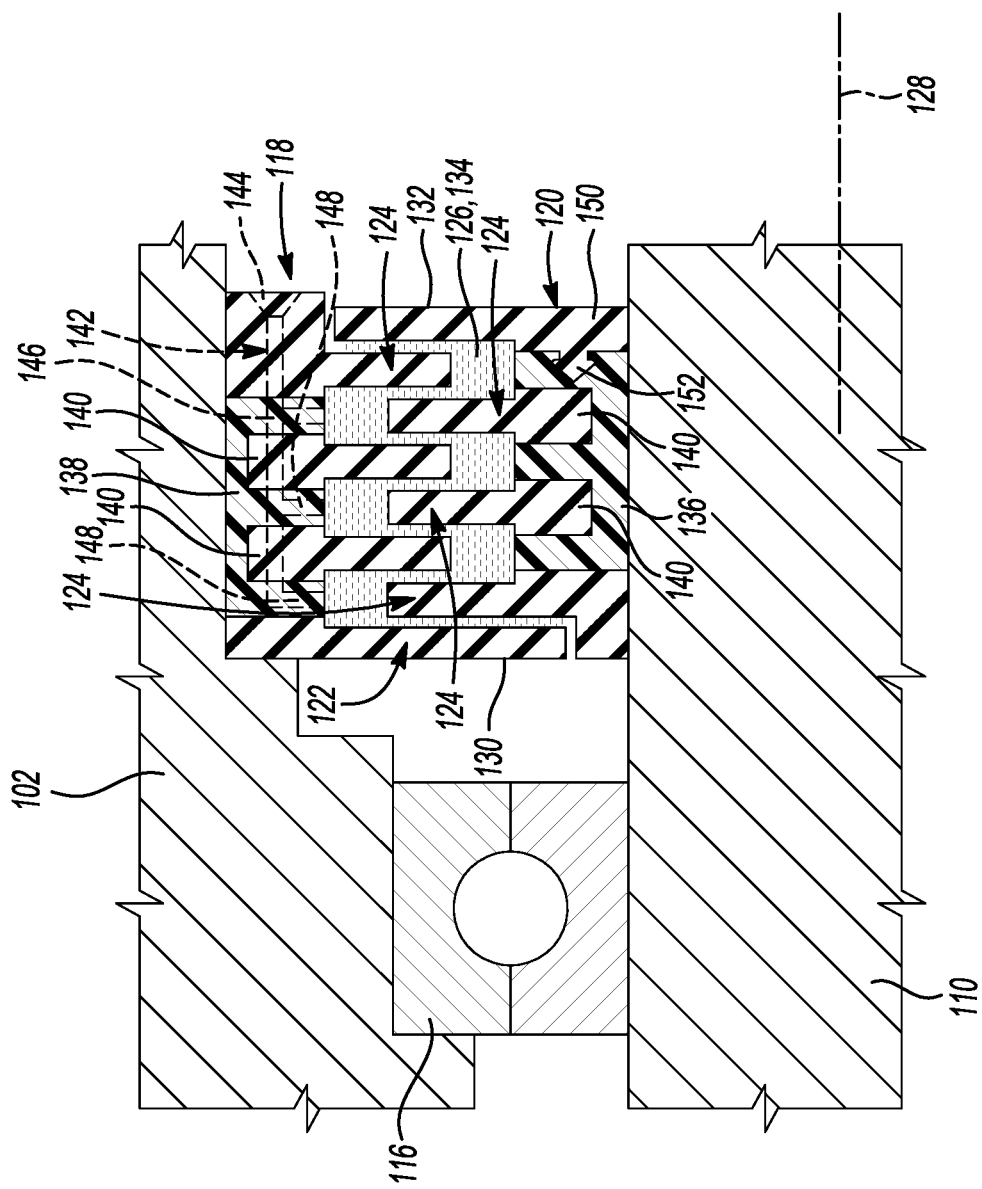
FIG. 4 is a partial cross-sectional view of taken along line 4-4 in FIG. 2 illustrating the seal and a bearing.

Referring to FIGS. 3 and 4, one of the seals 118 is illustrated in further detail. The seal 118 may be representative of one or both of the seals 118 illustrated in FIG. 2, with the exception that one of the seals 118 will be a mirror image of what is illustrated in FIG. 4. The seal 118 may be a labyrinth seal. The seal 118 includes an inner ring 120 and an outer ring 122 that are secured to the shaft 110 and the housing 102, respectively. The inner ring 120 and the outer ring 122 may also be referred to as radially inner portions and radially outer portions of the seal 118, respectively. The inner ring 120 and the outer ring 122 may also be referred to as first and second rings or portions of the seal 118.

The inner ring 120 and the outer ring 122 have interleaved projections, fingers, or protrusions 124 defining a tortuous channel 126 extending axially (i.e., along an axis 128 of rotation of the shaft 110 and rotor 108) between a first axial end 130 of the seal 118 and a second axial end 132 of the seal 118. A conductive grease 134 is disposed within the tortuous channel 126. The inner ring 120, outer ring 122, and conductive grease 134 are configured to direct electrical currents induced in the shaft 110 to the housing 102. More specially, the inner ring 120, outer ring 122, and conductive grease 134 form an electrically conductive pathway between the shaft 110 and the housing 102 to direct electrical currents induced in the shaft 110 to the housing 102. The inner ring 120, outer ring 122, and conductive grease 134 may collectively be positioned relative to the bearings 116 and may be more conductive than the bearings 116 in order to direct the electrical currents induced in the shaft 110 away from the bearings 116.

The inner ring 120 may have a first conductive region 136 extending between the shaft 110 and the conductive grease 134. The outer ring 122 may have a second conductive region 138 extending between the housing 102 and the conductive grease 134. The first conductive region 136, second conductive region 138, and the conductive grease 134 may more specifically form the electrically conductive pathway between the shaft 110 and the housing 102 to direct electrical currents induced in the shaft 110 to the housing 102 and away from the bearings 116.

The first conductive region 136 extends between sets of adjacent protrusions of the interleaved protrusions 124 that extend from the inner ring 120. The second conductive region 138 extends between sets of adjacent protrusions of the interleaved protrusions 124 that extend from the outer ring 122. The first conductive region 136 may also be interleaved with bases or roots 140 of the interleaved protrusions 124 that extend from the inner ring 120 and the second conductive region 138 may be interleaved with bases roots 140 of the interleaved protrusions 124 that extend from the outer ring 122.

The interleaved protrusions 124 may be made from or comprised of a non-conductive elastic material, such as, but not limited to, rubber, a soft plastic, or a soft polymer material. The conductive regions (i.e., the first conductive region 136 and the second conductive region 138) may be made from a conductive material such as, but not limited to, a metallic material (e.g., steel, copper, aluminum), graphite, or a conductive polymer. In an alternative embodiment, the conductive regions and the protrusions of each of the inner ring 120 and outer ring 122 may be made from a single solid material that includes both conductive and elastic properties. In such an alternative embodiment, the interleaved protrusions 124 of the inner ring 120 are incorporated into the first conductive region 136 and the interleaved protrusions 124 of the outer ring are incorporated into the second conductive region 138.

The outer ring 122 may define a channel 142 that is configured to route the conductive grease 134 to the tortuous channel 126. The conductive grease 134 may be supplied to the tortuous channel 126 via channel 142 during production of the seal 118 or during production of the electric machine 100. A plug 144 may be disposed within an end of the channel 142 once the tortuous channel 126 is filled to prevent the conductive grease 134 from flowing out of the tortuous channel 126 via channel 142. The channel 142 may include a primary channel 146 and secondary channels 148 that extend from the primary channel 146 to the tortuous channel 126. The secondary channels 148 may extend to the tortuous channel 126 at positions that are between the interleaved protrusions 124. Although not illustrated, the inner ring 120 may define a second channel that is configured to route the conductive grease 134 to the tortuous channel 126 or alternatively may define the channel 142 as opposed to the outer ring 122.

The inner ring 120 or the outer ring 122, or the first conductive region 136 or the second conductive region 138, may defined gaps where snap fit connecters may be disposed to route lubricating fluid to the internal cavity 104. The seal 118 may also include and end cap 150 that includes one or more protrusions 152 that are pressed into orifices defined on the inner ring 120 along the second axial end 132 of the seal 118. Alternatively, the protrusions 152 may be pressed into orifices defined on the outer ring 122 or along the first axial end 130 of the seal 118.

In an alternative embodiment, the inner ring 120, the outer ring 122, and end cap 150 may be reconfigured so that a portion 154 of the tortuous channel 126 reverses direction axially (i.e., along the axis 128 of rotation of the shaft 110 and rotor 108) proximate to one of the first or second axial ends 130, 132 of the seal 118. Such a reversal in direction further acts to ensure the conductive grease 134 remains captured within the tortuous channel 126 and prevents the conductive grease 134 from spilling out the tortuous channel 126.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:
1. A vehicle comprising:
an electric machine configured to propel the vehicle, the electric machine having,
a stator secured to a housing, a rotor (i) secured to a shaft and (ii) configured to transfer rotational power generated by the electric machine to at least one drive wheel via the shaft, and a labyrinth seal disposed between the shaft and the housing, the labyrinth seal comprising inner and outer rings secured to the shaft and housing, respectively, wherein (i) the inner and outer rings have interleaved protrusions defining a tortuous channel extending axially between first and second ends of the labyrinth seal, (ii) a conductive grease is disposed within the tortuous channel, (iii) the inner ring, outer ring, and conductive grease are configured to direct electrical currents induced in the shaft to the housing, (iv) the inner ring has a first conductive region extending between the shaft and the conductive grease, (v) the outer ring has a second conductive region extending between the housing and the conductive grease, and (vi) the first conductive region, second conductive region, and the conductive grease form an electrically conductive pathway between the shaft and the housing.

2. The vehicle of claim 1 further comprising a bearing disposed between the housing and the shaft, wherein the inner ring, the outer ring, and the conductive grease are positioned to direct the electrical currents induced in the shaft away from the bearing.

3. The vehicle of claim 1, wherein (i) the first conductive region extends between a first set of adjacent protrusions of the interleaved protrusions that extend from the inner ring and (ii) the second conductive region extends between a second set of adjacent protrusions of the interleaved protrusions that extend from the outer ring.

4. The vehicle of claim 3, wherein the interleaved protrusions are comprised of a non-conductive elastic material.

5. The vehicle of claim 1, wherein a portion of the tortuous channel reverses direction axially proximate to one of the first or second ends of the labyrinth seal.

6. The vehicle of claim 1, wherein one of the inner and outer rings define a channel configured to route the conductive grease to the tortuous channel.

7. A vehicle comprising:
a housing;
an electric machine (i) disposed within the housing and (ii) having a rotor shaft configured to transfer rotational power generated by the electric machine; and
a labyrinth seal disposed between the rotor shaft and the housing, the labyrinth seal comprising (i) a radially inner portion secured to the rotor shaft and (ii) a radially outer portion secured the housing, wherein (i) the inner and outer portions have interleaved elastic protrusions defining a tortuous channel extending axially between first and second ends of the labyrinth seal, (ii) the inner and outer portions have first and second conductive regions, (iii) a conductive grease is disposed within the tortuous channel, and (iv) the first conductive region, the second conductive region, and the conductive grease form an electrically conductive pathway between the rotor shaft and the housing.

8. The vehicle of claim 7 further comprising a bearing disposed between the housing and the rotor shaft, wherein the first conductive region, the second conductive region, and the conductive grease are positioned to direct the electrical currents induced in the rotor shaft away from the bearing.

9. The vehicle of claim 7, wherein (i) the first conductive region is interleaved with roots of the interleaved protrusions that extend from the inner portion and (ii) the second conductive region is interleaved with roots of the interleaved protrusions that extend from the outer portion.

10. The vehicle of claim 7, wherein the interleaved protrusions are comprised of a non-conductive material.

11. The vehicle of claim 7, wherein a portion of the tortuous channel reverses direction axially proximate to one of the first or second ends of the labyrinth seal.

12. The vehicle of claim 7, wherein one of the inner and outer portions defines a channel configured to route the conductive grease to the tortuous channel.

13. An electric machine comprising:
a housing defining an internal chamber;
a stator disposed within and secured to a housing;
a rotor shaft configured to transfer rotational power generated by the electric machine;
a labyrinth seal disposed between the rotor shaft and the housing, the labyrinth seal comprising first and second rings secured to the rotor shaft and housing, respectively, wherein the first and second rings have interleaved projections defining a tortuous channel extending between first and second axial ends of the labyrinth seal; and
a conductive grease disposed within the tortuous channel, wherein the first ring, the second ring, and the conductive grease form an electrically conductive pathway between the rotor shaft and the housing, and wherein (i) the first ring has a first conductive region extending between the rotor shaft and the conductive grease, (ii) the second ring has a second conductive region extending between the housing and the conductive grease, and (iii) the first conductive region, second conductive region, and the conductive grease form the electrically conductive pathway.

14. The electric machine of claim 13 further comprising a bearing disposed between the housing and the rotor shaft, wherein the first ring, the second ring, and the conductive grease are positioned to direct electrical currents induced in the rotor shaft away from the bearing.

15. The electric machine of claim 13, wherein (i) the first conductive region extends between a first set of adjacent protrusions of the interleaved protrusions that extend from the first ring and (ii) the second conductive region extends between a second set of adjacent protrusions of the interleaved protrusions that extend from the second ring.

16. The electric machine of claim 13, wherein (i) the first conductive region is interleaved with roots of the interleaved protrusions that extend from the first ring and (ii) the second conductive region is interleaved with roots of the interleaved protrusions that extend from the second ring.

17. The electric machine of claim 13, wherein the interleaved protrusions are comprised of a non-conductive elastic material.

18. The electric machine of claim 13, wherein a portion of the tortuous channel reverses direction axially proximate to one of the first or second axial ends of the labyrinth seal.

19. The vehicle of claim 8 further comprising a rotor disposed on the rotor shaft, wherein the bearing is disposed between the rotor and the labyrinth seal.

20. The electric machine of claim 14 further comprising a rotor disposed on the rotor shaft, wherein the bearing is disposed between the rotor and the labyrinth seal.

* * * * *